United States Patent
Cramer et al.

(10) Patent No.: US 11,748,708 B2
(45) Date of Patent: Sep. 5, 2023

(54) DYNAMICALLY GENERATED TASK SYSTEM WITH FEEDBACK CAPABILITY

(71) Applicant: International Business Machines Corporation, Armonk, NY (US)

(72) Inventors: Keith Donald Cramer, Pine Island, MN (US); Leslie Dwynn Lundquist, Auburn, WA (US); Barbara Elizabeth Wang, Austin, TX (US); Priya Ajay Ingle, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 79 days.

(21) Appl. No.: 17/030,065

(22) Filed: Sep. 23, 2020

(65) Prior Publication Data
US 2022/0092545 A1    Mar. 24, 2022

(51) Int. Cl.
G06Q 10/10       (2023.01)
G06Q 10/0631    (2023.01)
G06F 16/23       (2019.01)
H04L 9/40        (2022.01)
(Continued)

(52) U.S. Cl.
CPC ....... G06Q 10/103 (2013.01); G06F 16/2379 (2019.01); G06Q 10/06316 (2013.01); G06F 16/252 (2019.01); G06Q 10/105 (2013.01); H04L 63/08 (2013.01)

(58) Field of Classification Search
CPC .... G06Q 10/00; G06Q 10/0633; G06Q 10/03; G06Q 10/103; G06Q 10/06313; G06Q 10/06316; G06Q 10/105; G06F 16/252; G06F 16/2246; H04L 51/32; H04L 51/04; H04L 63/08; H04L 12/1813
See application file for complete search history.

(56) References Cited

U.S. PATENT DOCUMENTS

| | | | |
|---|---|---|---|
| 6,678,714 B1 | 1/2004 | Olapurath |
| 10,241,774 B2 | 3/2019 | Spivak |
| 10,395,187 B2 | 8/2019 | Weyl |

(Continued)

OTHER PUBLICATIONS

Azevedo et al., Installation Service: Supporting Deployment of Scientific Software as a Service, Nov. 1, 2015, 2015 7th IEEE Latin-American Conference on Communications, pp. 1-6 (Year: 2015).*

(Continued)

*Primary Examiner* — Robert D Rines
(74) *Attorney, Agent, or Firm* — Monchai Chuaychoo

(57) ABSTRACT

An approach for an automated task management system to accomplish set goals by completing a predefined set of tasks for that goal is disclosed. The approach includes creating a goal object by one or more users and creating one or more task objects associated with the goal object by the one or more users. The approach includes executing a first task of the one or more task objects and determining if there is one or more deviations associated with executing the first task. Users can directly define deviations which are stored into the tasks directly as a deviation path without needing admin approval. Based on determining there is the one or more (Continued)

deviations, the approach can optionally ask for an approval from an administrator. Deviation tasks objects are stored into the goal object for future users to view and use.

20 Claims, 5 Drawing Sheets

(51) Int. Cl.
  *G06Q 10/105* (2023.01)
  *G06F 16/25* (2019.01)

(56) References Cited

U.S. PATENT DOCUMENTS

| | | | | |
|---|---|---|---|---|
| 11,182,719 | B1* | 11/2021 | Doan | G06N 20/00 |
| 2010/0257470 | A1* | 10/2010 | Ari | G06Q 10/06 715/764 |
| 2014/0019187 | A1* | 1/2014 | Olsen | G06Q 10/06313 705/7.23 |
| 2015/0088569 | A1* | 3/2015 | Fernandez | G06Q 10/063114 705/7.15 |
| 2015/0100943 | A1* | 4/2015 | Gabel | G06F 40/20 717/106 |
| 2016/0124742 | A1 | 5/2016 | Rangasamy | |
| 2019/0057333 | A1* | 2/2019 | Jenkins | G06Q 10/06393 |
| 2019/0251486 | A1 | 8/2019 | Gottemukkala | |
| 2020/0301902 | A1* | 9/2020 | Maloy | G06F 16/2246 |
| 2021/0103863 | A1* | 4/2021 | Hiller | G06Q 10/0633 |

OTHER PUBLICATIONS

"Avaza—Project Management, Timesheets & Invoices for Teams", Avaza, downloaded from the internet on Sep. 4, 2020, 7 pages, <https://www.avaza.com/>.

"Help desk software | IT service desk software | ManageEngine ServiceDesk Plus", ManageEngine, downloaded from the internet Sep. 4, 2020, 14 pages, <https://www.manageengine.com/products/service-desk/?adminguide>.

"IBM Business Process Manager Overview", IBM, downloaded from the internet on Feb. 19, 2020, 6 pages, <https://www.ibm.com/support/knowledgecenter/SSFTBX_8.57/com.IBM.wbpm.main.doc/topics/ibmbmp_overview.html>.

"monday.com: Where Teams Get Work Done", Monday.com, downloaded from the internet on Sep. 4, 2020, 7 pages, <https://monday.com/>.

* cited by examiner

US 11,748,708 B2

DYNAMICALLY GENERATED TASK SYSTEM WITH FEEDBACK CAPABILITY

BACKGROUND

The present invention relates generally to the field of computer software, and more particularly, to modifying task management system by adding flexible tasks with deviations.

Project management software is designed to assist a user (i.e., project manager) in developing a schedule (including goals and tasks), assigning resources to tasks, tracking progress, managing the budget, and analyzing workloads. Some project management software can create critical path schedules and critical chain events. Schedules can be defined at resource level and the chains can be graphically represented such as a Gantt chart.

Other project management software can create budgets based on the assignment work and resource rates. Resources can be assigned to tasks and assignment work estimated. The software can also calculate the cost (equivalent to the work times the rate), which rolls up to the task level and then to any summary tasks and finally to the project level.

SUMMARY

Aspects of the present invention disclose a computer-implemented method and computer system for project management. The computer implemented method includes creating a goal object by one or more users; creating one or more task objects associated with the goal object by the one or more users; executing a first task of the one or more task objects; determining if there is one or more deviations associated with executing the first task; responsive to determining there is the one or more deviations, adding new one or more task objects, based on the one or more deviations, to the goal object; and storing the goal object with the new one or more task objects for future users.

In another embodiment, the computer system includes one or more computer processors; one or more computer readable storage media; program instructions stored on the one or more computer readable storage media for execution by at least one of the one or more computer processors, the program instructions comprising: program instructions to create a goal object by one or more users; program instructions to create one or more task objects associated with the goal object by the one or more users; program instructions to execute a first task of the one or more task objects; program instructions to determine if there is one or more deviations associated with executing the first task; responsive to determine there is the one or more deviations, program instructions to add new one or more task objects, based on the one or more deviations, to the goal object; and program instructions to store the goal object with the new one or more task objects for future users.

BRIEF DESCRIPTION OF THE DRAWINGS

The present invention is described in the detailed description, which follows, references the noted plurality of drawings by way of non-limiting examples of exemplary embodiments of the present invention.

DETAILED DESCRIPTION

Figure 1:
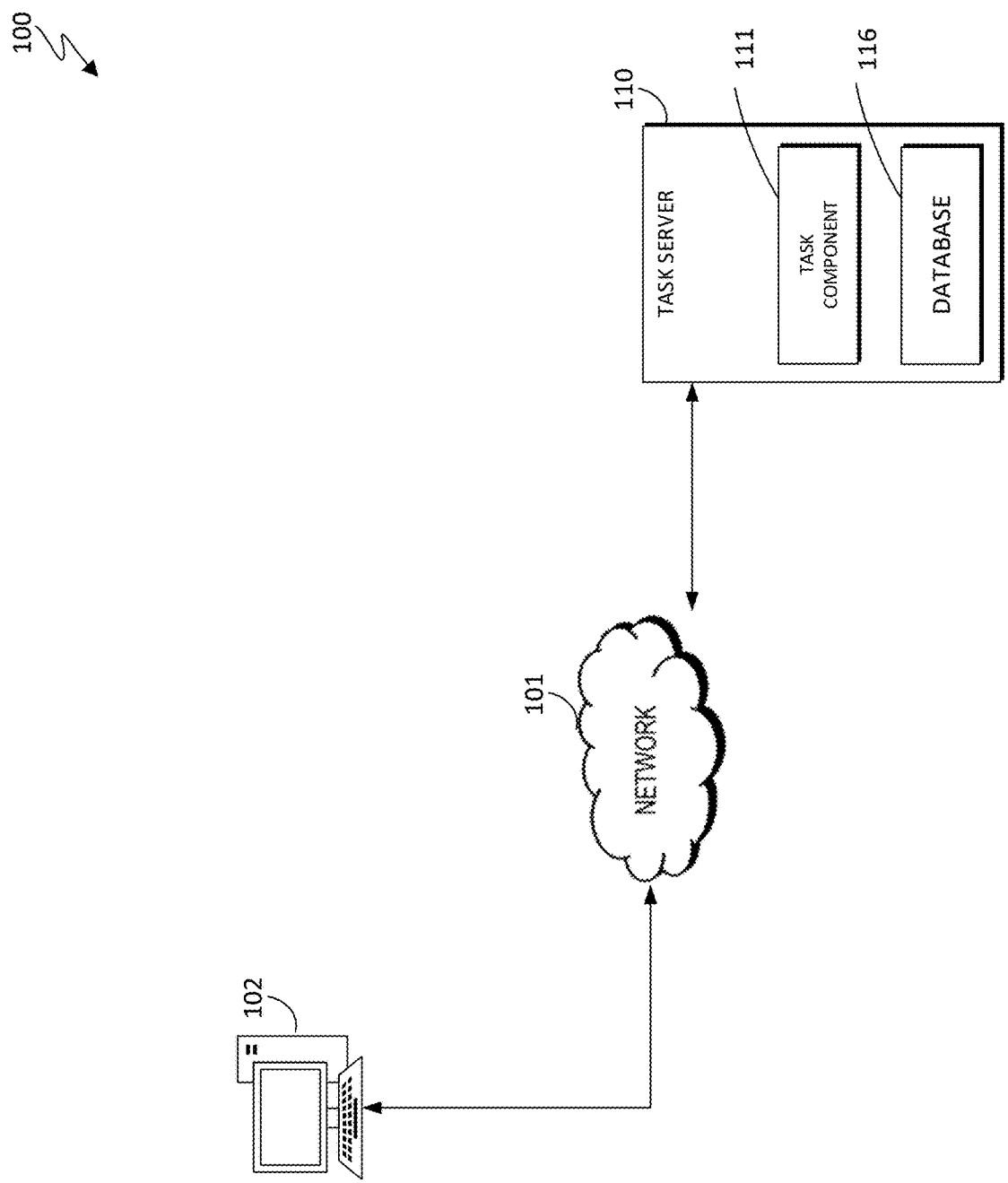
FIG. 1 is a functional block diagram illustrating a topology of a task environment, designated as 100, in accordance with an embodiment of the present invention.

Embodiments of the present invention provides an approach for an automated task management system to accomplish set goals by completing a predefined set of tasks for that goal. Embodiment allows participants to modify, update, or change tasks and sub-tasks based on the experience of execution of the task. The feedback in the form of changed tasks can be incorporated into the task library. Future users of the task can see the baseline task, and the "modified task" after information is added by users of the task. For example, i) elements can show environment differences, such as a different environment for the user (i.e., execution differences in Windows® versus Linux OS environments), ii) elements can show mistakes in the original task, iii) elements can show improvements over the original task, for example, a new and automated script written by a task user that replaces manual instructions, iv) changes can be auto-updated to the task library, and the process owner can choose to change the baseline task using those change elements (i.e., approval process), and v) tasks may be specified in terms of divergent paths for different environments (as for the elements given in item a, previously).

Some embodiments of the present invention recognize the following advantages: i) addresses the problem of task sequence management in an automated way that provides flexibility and expandability to be applicable to different platforms, ii) a way to record the divergences as valid task sequences, iii) administrators can create users and assign users roles that grant different authority over resources, and iv) users can dynamically create deviations to approved tasks. Then, users can use standard SSL authentication for access.

Other embodiments of the present invention provides a unique task view within the dynamic task management by offering: i) original baseline task, ii) delta tasks based on environment, iii) delta tasks based on a user type (i.e., an administrator instead of a daily user), iv) delta tasks based on time (i.e., last person to execute the task), v) the list of all deltas is preserved and vi) users can define delta tasks. Therefore, someone executing the tasks can always see the universe of delta steps stored in the system. Some user may find this the delta steps essential, because that user may find a path to solve a blocker by examining the deltas.

Furthermore, embodiment is self-documenting, which means that the task system itself and task library itself will serve as the system's documentation. Instead of traditional documentation in the form of documents, or Wikis, our task system can generate the tasks and subtasks as static documentation, dynamically. This capability allows any tasks in the library to be "viewed" as well as assigned and executed. Features of this approach includes the following: i) the "Process owner" can view the delta tasks as feedback into the system, and decide whether to make changes to the baseline task (i.e., this is the approval process), ii) a user can view each task and all of the steps, before actually being assigned and executing the task, thus improving familiarity with new tasks, iii) a user that has completed the task can go back and see all the steps that were executed, for training purposes, iv) while executing tasks, a user can suggest task changes that are reflected back to the process owner, to be incorporated in the task library as feedback. Thus, the changes are immediately added to the task without approval of the process owner showing a deviation. Then a separate admin step allows the process owner to see the deviation and decide if it should be "approved" or added as the main path in the goal. Even if the changed task is not "approved" it still is persisted in the system for future users to see as an alternative path.

Some other embodiment of the present invention provides an automated task management system. The exemplary embodiment is a web-based system using micro services with a backend of the system stores data to a database and can be deployed in a cloud architecture. As tasks are completed or updated, the system must allow task workers to enter feedback or updates that they encounter while completing the tasks. The updates can automatically be reflected in the task for the next user. There may be Different task paths based on criteria (e.g., user type, time, environment). For example, different user roles may only see a subset of certain tasks and different operating environment may require variations of the completion criteria to complete a certain task or user may need to see the tasks in a different order. As tasks are completed or changed, the system can show changes to the status of the tasks and where deviations to the task occur as well as propagate consequences of the changes to the task throughout the system if such changes impact other tasks. It is noted that all deviations are visible to users of the system. For example, a user can see a "Linux" based task and a "Windows" based task at the same time and choose which tasks to follow.

A detailed description of embodiments of the claimed structures and methods are disclosed herein; however, it is to be understood that the disclosed embodiments are merely illustrative of the claimed structures and methods that may be embodied in various forms. In addition, each of the examples given in connection with the various embodiments is intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the methods and structures of the present disclosure.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments, whether or not explicitly described.

FIG. 1 is a functional block diagram illustrating a topology of a task environment, designated as 100, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Task environment 100 includes task server 110 and client computing device 102.

Network 101 can be, for example, a telecommunications network, a local area network (LAN), a wide area network (WAN), such as the Internet, or a combination of the three, and can include wired, wireless, or fiber optic connections. Network 101 can include one or more wired and/or wireless networks that are capable of receiving and transmitting data, voice, and/or video signals, including multimedia signals that include voice, data, and video information. In general, network 101 can be any combination of connections and protocols that can support communications between task server 110, client computing device 102 and other computing devices (not shown) within task environment 100. It is noted that other computing devices can include, but is not limited to, mobile computing device and any electromechanical devices capable of carrying out a series of computing instructions.

Task server 110 can be a standalone computing device, a management server, a web server, a mobile computing device, or any other electronic device or computing system capable of receiving, sending, and processing data. In other embodiments, task server 110 can represent a server computing system utilizing multiple computers as a server system, such as in a cloud computing environment. In another embodiment, task server 110 can be a laptop computer, a tablet computer, a netbook computer, a personal computer (PC), a desktop computer, a personal digital assistant (PDA), a smart phone, or any other programmable electronic device capable of communicating other computing devices (not shown) within 100 via network 101. In another embodiment, task server 110 represents a computing system utilizing clustered computers and components (e.g., database server computers, application server computers, etc.) that act as a single pool of seamless resources when accessed within task environment 100.

Client computing device 102 can represent devices used to invoke/run/utilize task component 111. Client computing device 102 can be a laptop computer, a tablet computer, a smart phone, or any programmable electronic mobile device capable of communicating with various components and devices within task environment 100, via network 101. It is noted that client computing device 102 can also be a wearable computer. Wearable computers are miniature electronic devices that can be worn by the bearer under, with, or on top of clothing, as well as in or connected to glasses, hats, or other accessories. Wearable computers are especially useful for applications that require more complex computational support than merely hardware coded logics. In general, client computing device 102 represents any programmable electronic device or combination of programmable electronic devices capable of executing machine readable program instructions and communicating with other computing devices (not shown) within task environment 100 via a network, such as network 101. In the present embodiment, client computing device 102 can represent one or more computing devices. In another embodiment, client computing device 102 can include secondary computing devices (not shown) within task environment 100. The secondary computing devices (i.e., wearable computing device) can be used in conjunction with client computing device 102.

Task server 110 includes task component 111 and database 116.

Task component 111 provides a task management system for accomplishing set goals by accomplishing a predefined set of tasks for that goal. Furthermore, task component 111 can address the problem of task sequence management in an automated way that provides flexibility and expandability to be applicable to different platforms and a way to record the divergences as valid task sequences.

Other embodiment of task component 111 can provide a task management system that is created by an administrator to track project tasks such as installing a database or completing a tax form. The embodiment can allow an admin defined task to be executed with manual and automated steps by an end user, and then have the end user give feedback into the system for deviations they did to the original defined task.

Database 116 is a repository for data used by task component 111. Database 116 can be implemented with any type of storage device capable of storing data and configuration files that can be accessed and utilized by task server 110, such as a database server, a hard disk drive, or a flash memory. Database 116 uses one or more of a plurality of techniques known in the art to store a plurality of information. In the depicted embodiment, database 116 resides on task server 110. In another embodiment, database 116 may reside elsewhere within task environment 100, provided that task component 111 has access to database 116. Database 116 may store information associated with, but is not limited to, goals/task management software, dependencies between goals and tasks, corpus of business applications, corpus of tools and software development applications, profile of users, profile of system administrators and documentation application.

Embodiment of the present invention can be implemented as a web-based system, using micro-services (i.e., task server 110 and client utilizing client computing device 102). If implemented as a web-based system, then the application is accessible from a web GUI in any browser (e.g., client computing device 102, etc.). The backend of the system can persist (store) data to a database (i.e., database 116). The embodiment could be deployed in a cloud architecture, such as IBM® cloud.

Figure 2:
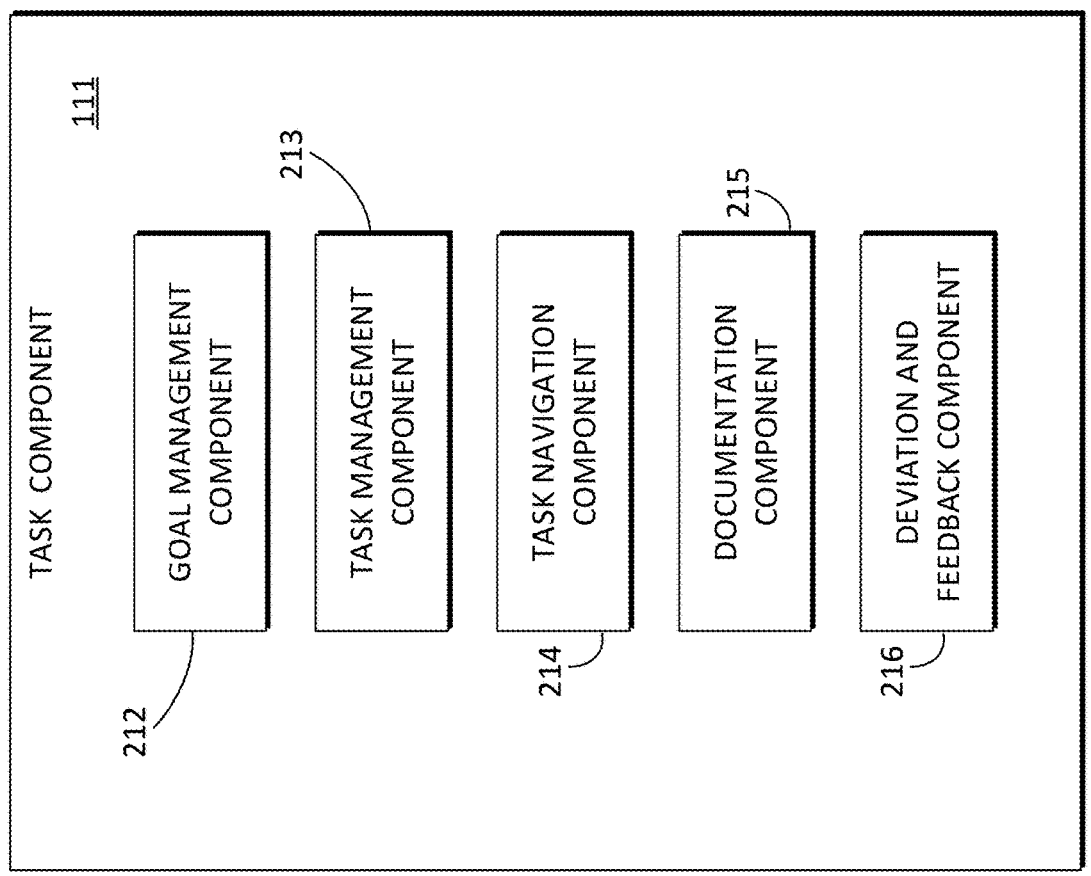
FIG. 2 is a functional block diagram illustrating serverless component in accordance with an embodiment of the present invention.

FIG. 2 is a functional block diagram illustrating task component 111 in accordance with an embodiment of the present invention. In the depicted embodiment, task component 111 includes goal management component 212, task management component 213, task navigation component 214, documentation component 215, and deviation and feedback component 216.

As is further described herein below, goal management component 212, of the present invention provides the capability of creating goal object, which represents a state or accomplishment that needs to be achieved by other users by a user (i.e., administrator). For example, a goal object could be defined as setting up a new development user, so that the new user has the tools and system access needed to develop software for a project. It is noted that the system GUI can allow the user to define a goal object that will be persisted (stored). Furthermore, users can create modify, delete, and list goals. Each goal can contain multiple tasks.

As is further described herein below, task management component 213 of the present invention provides the capability of creating task object, managing dependencies between task objects and manage task approval process. An administrative user can create a task object, which represents a concrete action that can be executed by a user. Tasks can be automated, manual, or a combination of both. For example, a manual task could be for a user to send an email to a systems administrator requesting access (a new user ID and password) for a cloud-based test server, because access is needed for performing software testing. An example of an automated task could be a Linux script that can be executed on a target workstation to install and configure a new Interactive Development Environment (IDE), which enables software development on that workstation. Furthermore, tasks can be subdivided into sub-tasks, in which the top-level task is not complete until all the sub-level tasks are complete. Tasks can be created, deleted, updated, and listed, and they are stored in the system task library. Sub-tasks (steps) are just tasks with another task as the parent. Top-level tasks have a goal as a parent. The administrator also can assign a deadline for the total time allowable to complete a task.

Task management component 213 can manage dependencies between task objects. If a task has a dependency on another task, it cannot be started until all the dependencies are resolved. A task can be started, marked on-hold, skipped if not needed, blocked, or resolved. Upon each transition, a notification is sent to the task owner and goal owner.

Task management component 213 can manage an approval process. The approval process allows a user to start a task, which will set that task to blocked status, until an administrator marks the task request as approved. Some tasks do not need to have an approval attribute and can be executed by any user. For tasks marked with an approval attribute, our system can meter access to resources. For example, if the task is to obtain access to a test server, the approval would be needed before user ID and password credentials are created on the target server. In this case, when the user starts the task, it goes into a blocked state, and if the administrator approves, the task would be marked complete. Otherwise the task is marked failed, and the log shows why the administrator decided not to grant approval. It is noted that task management component 213 manages task approval process, not approval of adding deviation tasks to the official path of task execution. Approval of deviation of tasks and/or sub-tasks to the official path can be done later by a system administrator.

As is further described herein below, task navigation component 214, of the present invention provides the capability of managing task navigation. Task navigation can comprise of the following characteristics: i) within a goal, a number of tasks can be assigned, ii) the tasks can be sequential or parallel tasks, iii) when a user selects a goal to process, the user is presented with a list of tasks and a task order to execute, iv) so, a user can be presented with multiple paths of tasks to choose from and can use criteria to select which set of tasks to execute. For example, a user could filter the tasks based on Operating system (Windows versus Linux) and the common tasks and the OS specific tasks from the filter will be selected for the user to execute. Another criteria filter example could be the last successful execution of the task list, which could include "skipped" steps, or deviations from the base line list of tasks. It is noted that multiple criteria can be selected in the filter. For example, the last successful OS Linux execution or the goal.

As is further described herein below, documentation component 215, of the present invention provides the capability of managing documentation for goals and tasks (either goals with tasks or separately for goals and tasks). Goals with tasks can be stored in a library. This library includes all deviations that users might have submitted when they were executing goals and tasks. Embodiment can support reporting of the goals and tasks in the form of web and print documentation. The documentation shows the possible paths that can be executed by a user, filtered by criteria that can show specific paths through the task possibilities. All possibilities can be generated. With this mechanism, when a task is modified, the modification is added to the library automatically, and the documentation is updated automatically to include this deviation. Another aspect of the documentation is that it allows a user to see all of the tasks in a goal, without actually executing the tasks. In effect, goals and tasks, deviations and modifications, and multiple paths of task execution are included in the documentation, automatically.

As is further described herein below, deviation and feedback component 216, of the present invention provides the capability of managing task deviation and task feedback. A fundamental issue with existing art, is the process of modifying the task library with changes encountered while a user tries to execute a goal. If a user is processing the list of tasks and discovers a problem with a task during execution, that user can update the task to add a deviation. For example, if a task requires additional manual steps to complete, that are not in the original task, the user can edit the manual step list in the task and add in changes. This will mark the task as a deviation in the system, and all future users executing a goal will see this deviation as a choice of a task in the path.

When a task is marked with a deviation, the administrator is notified of the modified task, and can take action, if desired, to update the base task so that it includes the deviation, and thereby make that modified version into the new base task. The administrator also can choose to allow the original base task and deviations to exist, so users have a choice of the best path to follow. When the user updates a task as a deviation, they can state the case for deviation, add details of changes and provide some proof of validation of the changes. It can be simple screenshots. If user makes any improvements to the task such as writing some automation scripts or finding correct sequence for the versions of tools he is using, they can be also added as a deviation. In effect the user can edit the task with the changes needed for deviation.

In an alternative embodiment, task component 111 can be summarized by the following walkthrough steps during executing state according to the user selection (i.e., when the users selects "start task" button in the GUI): i) the task record is updated with the start date and time, ii) if the task is an automated task, the automation script is executed and the task status is marked complete, or failed and the date/time is updated. Errors from the automation are added to the task log, iii) if the task is manual, or a combination of automated and manual steps, the user can mark each manual step as complete, failed, or on-hold, and can add an error or status message to the task log. Or, if a task step is automated, the user can select to execute the automated task, and the result will be added to the log, and iv) once all of the task steps are marked as complete, the overall task status is changed to "complete".

Furthermore to the prior embodiment, other steps such as user intervention that may occur can be summarized as follows: i) if a task has any steps that did not reach completion because of failure, or any steps marked as blocked, the task will not be marked complete until the failed steps are resolved. If a user selects to skip a blocked or failed step, this skipping action allows the step to be marked as complete, ii) if the user marks the task as on-hold, then the task status cannot be marked complete until it is resolved, iii) if the user marks the task as skipped or not needed, the task status will be marked completed, iv) if the user marks the task as blocked, the task status will be marked blocked, and v) a user can override a task and mark it complete (resolved), even if the task has not actually been completed, but the status and log will be retained with the actual status.

Figure 3A:
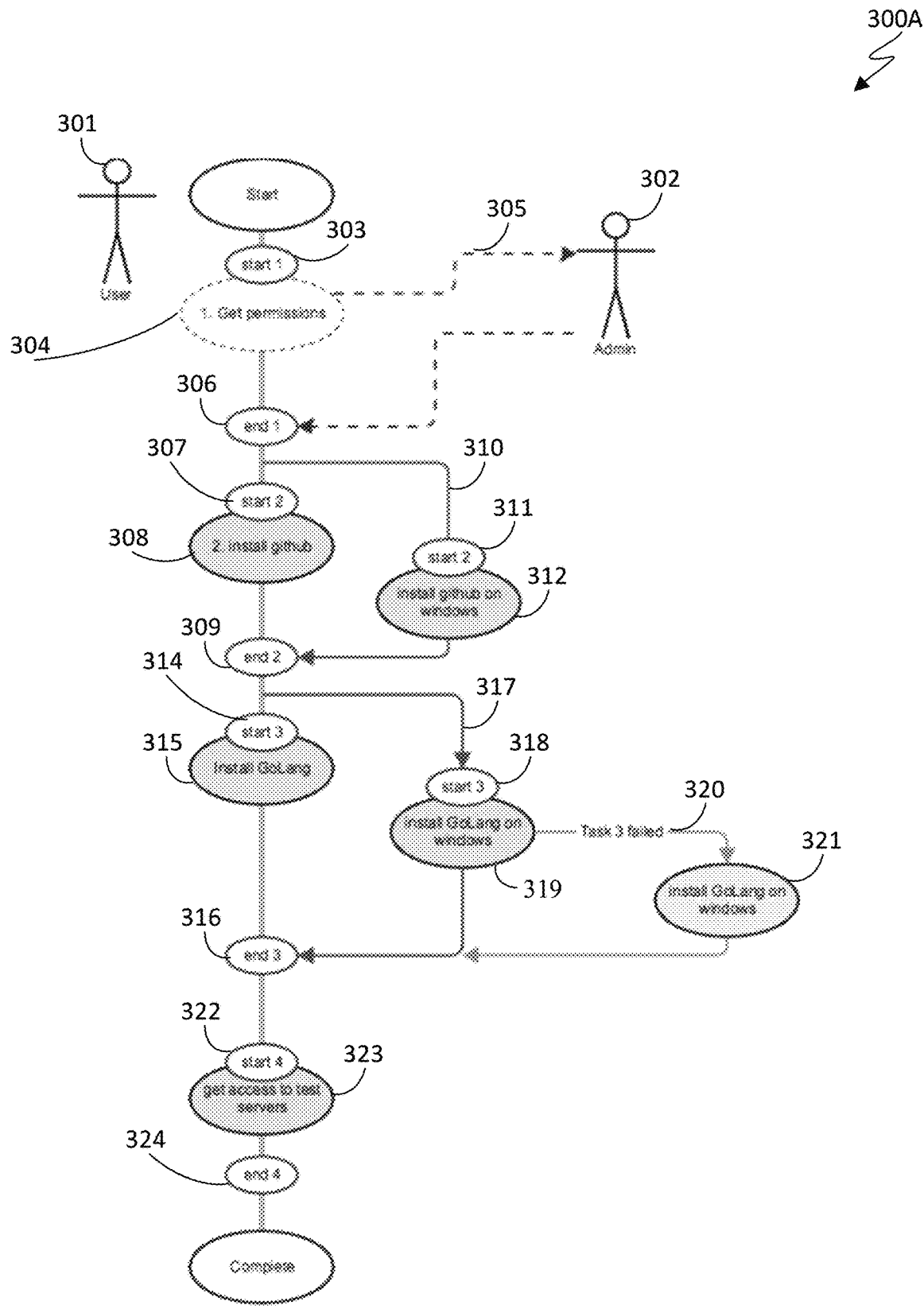
FIG. 3A is a flowchart of a scenario illustrating an operation of task component 111, designated as 300A, in accordance with an embodiment of the present invention.

FIG. 3A is a flowchart illustrating aa operation of task environment 100 associated with a scenario, designated as 300A, in accordance with one embodiment of the present invention. The scenario for 300A is a project goal of setting a new dev (development) environment. There are four tasks related to the setup of the dev environment: i) get permissions, ii) install GitHub®, iii) install Golang and iv) get access to test servers.

User 301 of the present invention is given a goal (based on the above scenario) on setting up a new dev environment. The goal has four tasks. FIG. 3A, shows deviation from the base path with feedback. The length of lines connection task nodes can represent the estimated task duration and complexity.

The first task (get permissions) begins at 303 (i.e., task one begins 303). This is a manual task requiring a system administrator (admin 302) to give access (step 304) to the users (user 301). Path 305 illustrates manual tasks (i.e., usually denoted by dashed lines versus automated tasks which are denoted by solid lines). Once completed, the task is closed (task one end 306).

The second task starts at 307 (i.e., second task begins 307). Step 308 is an automated step of installing GitHub® on Linux. However, there's a deviation path (i.e., task two deviation 310) since installing on Windows was also required and wasn't part of the original plan. Thus, an alternative second tasks (i.e., at alternative second task begins 311) involves installing GitHub® is required as part of step 312. A step 309, both second tasks are completed (i.e., second task begins 307 and alternative second task begins 311).

The third task (i.e., third task 315) starts at 314 (i.e., third task beings 314). Third task 315 involves installing Golang (i.e., open source programming language) on the Linux environment. However, the installation onto a windows platform is also required (path 317). Thus, alternative third task begins 318 is started to install Golang on a Windows platform (i.e., alternative third task 319). However, the version of Golang used to install on Windows was the incorrect version and the installation failed (i.e., third task failed 320). Thus, after discovering the issue with the incorrect version, user 301 created a script to install the correct version (i.e., correct alternative third task 321) and submitted it as feedback to the subtask. The third task ends at step 316. It is noted that a system admin could choose to take a deviation path (i.e., starting at 320) and merge this into the mainline path eliminating this deviation if so desired.

The fourth task (i.e., fourth task 323), an automated task, begins at 322 (i.e., fourth task begins 322). The fourth task consists of getting access to test servers and is completed (i.e., fourth task ends 324) without any deviation/issues.

It is noted within the illustration that the diagram shows the flexibility of the system where multiple execution paths exist simultaneously. All the tasks can be seen and printed/published to users. Furthermore, the main (i.e., "official") path starts at 306 and follows a straight path along the following several points (e.g., 307, 309, 316, 322) and finishes up at 324. Deviations from the main path such as task two deviation 310, path 317 and third task failed 320 are possible alternatives from the main path.

Figure 3B:
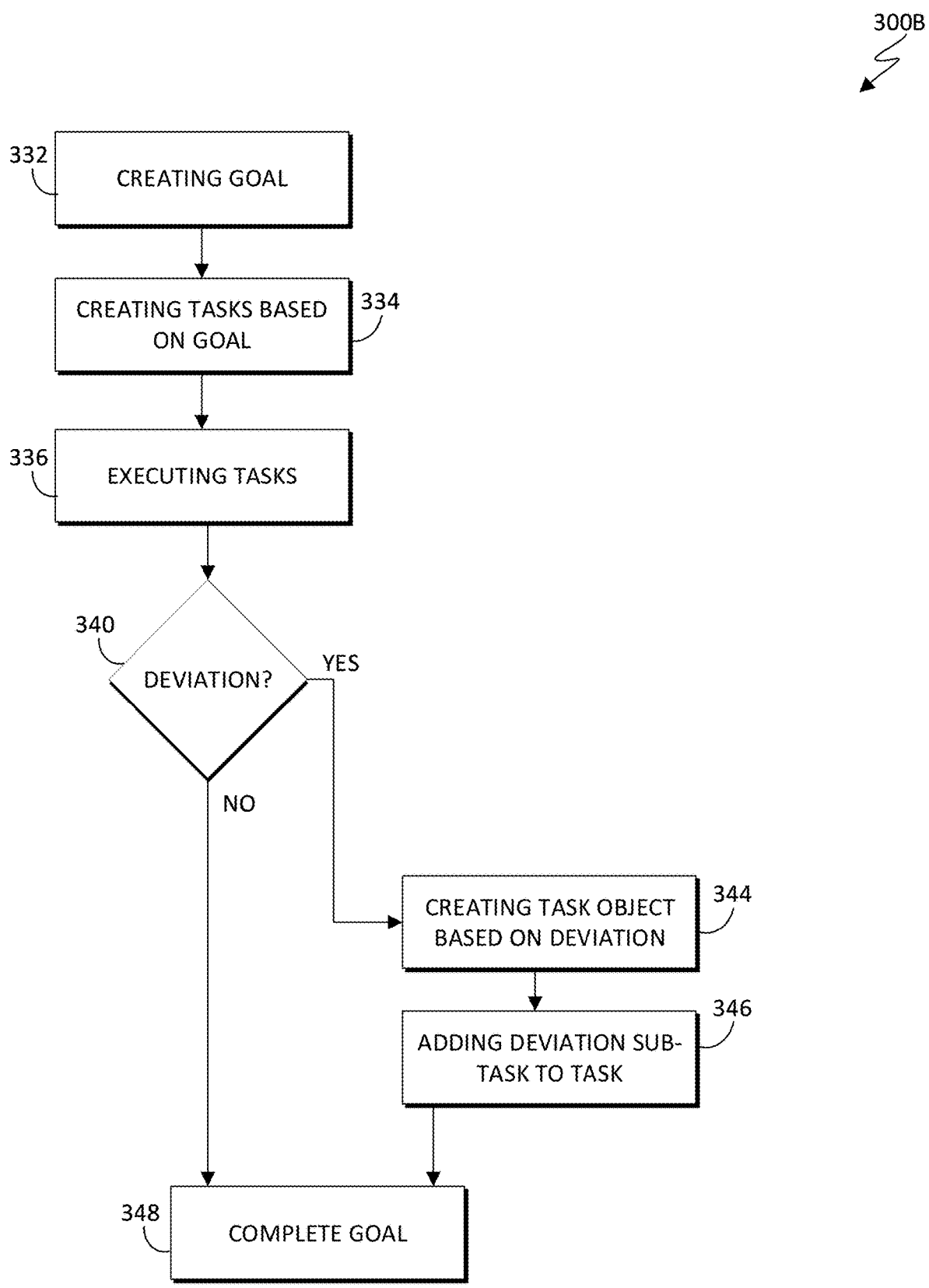
FIG. 3B is a flowchart illustrating the operation of task component 111, designated as 300B, in accordance with an embodiment of the present invention.

FIG. 3B is a flowchart illustrating an operation of task environment 100, designated as 300B, in accordance with another embodiment of the present invention.

Task component 111 create a goal (step 332). In an embodiment, task component 111, through goal management component 212, creates goals within a project. For example, the project is to develop software that allows IoT devices to be automatically integrated into a user home and be controlled by a smart phone. User could create several goals within the project to accomplish this task. The goals, created by goal management component 212, can include i) define type of IoT device and ii) integrate IoT device with smartphone. It is noted that process flow can be used for one goal at a time or multiple goals with tasks and subtasks at the same time.

Task component 111 create tasks (step 334). In an embodiment, task component 111, through task management component 213 and task navigation component 214, creates and manage tasks based on the goals (from step 332). For example, referring to the project to integrate IoT devices with smartphones, several tasks, can be created by task management component 213, such as i) identifying IoT device and ii) using existing IoT Orchestration platform for the first goal (i.e., define type of IoT device).

In another embodiment, task component 111, through goal management component 212, selects the goal object from a GUI for processing and presenting a user with multiple paths of the tasks objects, including sub-tasks associated with the selected goal object and criteria to complete the task objects of the selected goal object. For example, the goal of identifying IoT device has two tasks. Users can choose the two tasks to follow. The second goal can also have tasks such as i) installing IoT application and ii) installing application to turn on the WIFI setting of the phone when home.

Task component 111 execute tasks (step 336). In an embodiment, task component 111, through task management component 213 and task navigation component 214, executes a task by the user. For example, user can mark the current task of identifying IoT device as being "work in progress."

Task component 111 determine whether there is a deviation based on the result of the executed task (decision block 340). In an embodiment, task component 111, through deviation and feedback component 216, determines if there's an issue with completing the current task. If there's an issue with the current task ("YES" branch, decision block 340) then task component 111 proceeds to add a task object (step 344). If there is not an issue with the current task ("NO" branch, decision block 340), then task component 111 proceed to finish the goal (step 348). For example, user may have an issue with the task (i.e., installing IoT application) associated with the second goal, integrating with smartphones. There are several versions of the IoT application that works only on the Android 8. Thus, on newer phones with Android 10, the IoT application does not install correctly. However, there are workaround for the application to install on Android 10 smartphones.

Task component 111 creates task objects (step 344). In an embodiment, task component 111, through task management component 213 and task navigation component 214, creates task objects based on the deviation. For example, the current version of IoT application that will not work Android 10. Thus, a new task is added to the goal (deviation) to allow users to note that a work around is required to install the current version of the IoT application on Android 10 phones. It is noted that the user can create deviation sub-tasks without approval. This allows future users of the task to choose the "official" path, or a deviation path immediately. Thus, the approval of a deviation task is done latter by a system administrator where the deviation path can be made the "approved" main path or left as an alternative but not the "approved."

Task component 111 adds deviation sub-task to the task object (step 346). In an embodiment, task component 111, through task management component 213 and task navigation component 214, can add the sub-task to the task object as an alternative path. Thus, storing the sub-tasks as deviation sub-task object in the goal object.

In an alternate embodiment, task component 111, through task management component 213 and task navigation component 214, can store the new task object as a deviation. Furthermore, task component 111 can update a library of goal objects with the applied deviation. In another embodiment, task component 111, through documentation component 215 can save the deviation in a notation/documentation for future reference.

In another embodiment, task component 111, through task management component 213 and task navigation component 214 can mark the new task object as a deviation. And task component 111 can notify an administrator of the task object about the deviation for approval or the added deviation to the task object, or automatically applying the deviation to the task object.

In another embodiment, task component 111, through goal management component 212 and task management component 213, can update a library of goal objects with the deviations applied to the task objects for future users to select with the deviations already applied as a selectable path from the multiples paths for completing the goal object.

In another embodiment, task component 111, through documentation component 215, can document the deviation, including the added tasks, for future user.

Task component 111 complete the goal (step 348). In an embodiment, task component 111 completes the goal. For example, installing IoT application was successful on Android 10. Thus, the task and/or goals can be used/repeated for other smartphone devices.

Figure 4:
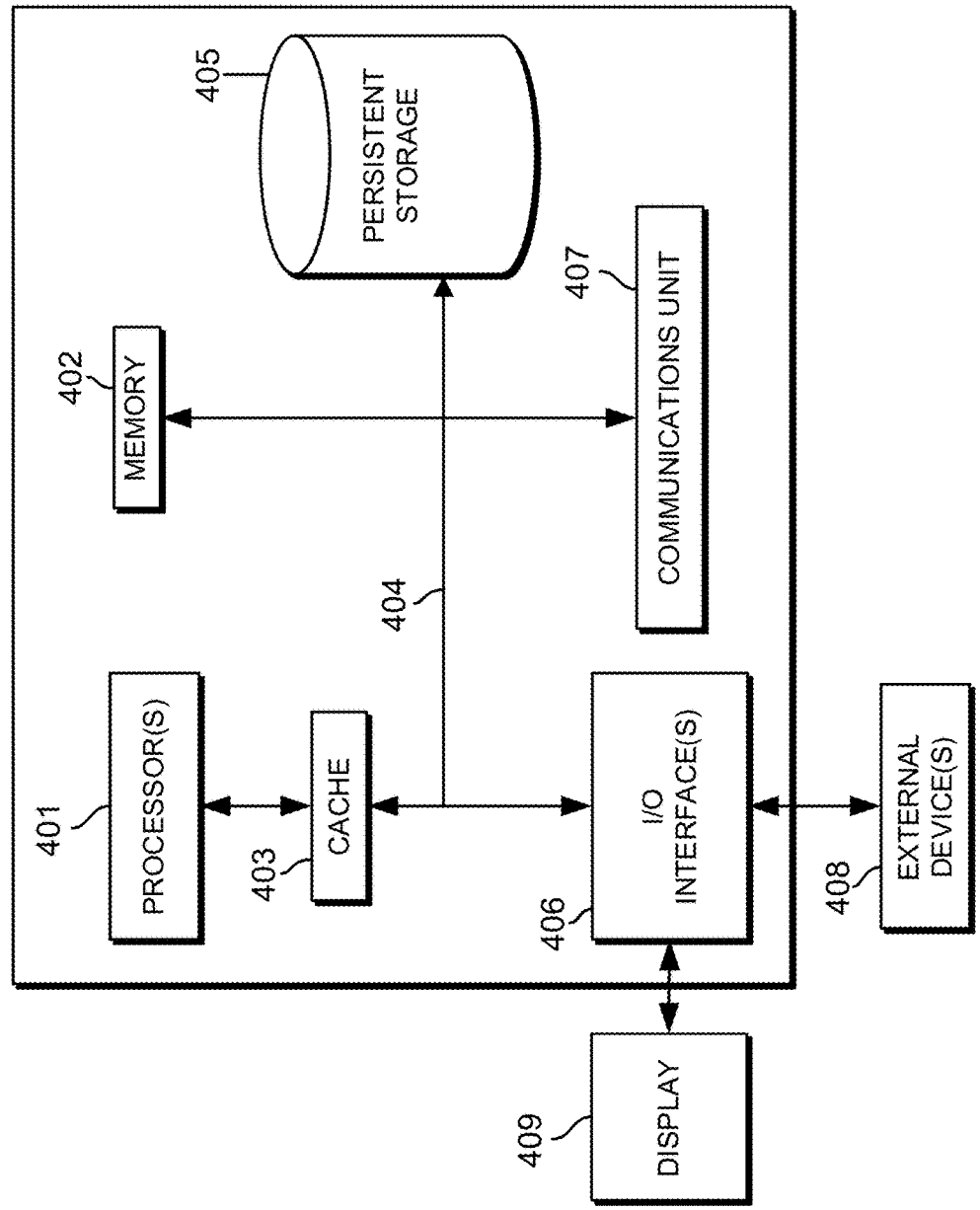
FIG. 4 depicts a block diagram, designated as 400, of components of a server computer capable of executing the task component 111 within the task environment, of FIG. 1, in accordance with an embodiment of the present invention.

FIG. 4 depicts a block diagram of components of task component 111 application, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

FIG. 4 includes processor(s) 401, cache 403, memory 402, persistent storage 405, communications unit 407, input/output (I/O) interface(s) 406, and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processor(s) 401 by holding recently accessed data, and data near recently accessed data, from memory 402.

Program instructions and data (e.g., software and data x10) used to practice embodiments of the present invention may be stored in persistent storage 405 and in memory 402 for execution by one or more of the respective processor(s) 401 via cache 403. In an embodiment, persistent storage 405 includes a magnetic hard disk drive. Alternatively, or in addition to a magnetic hard disk drive, persistent storage 405 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405. Task component 111 can be stored in persistent storage 405 for access and/or execution by one or more of the respective processor(s) 401 via cache 403.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data (e.g., task component 111) used to practice embodiments of the present invention may be downloaded to persistent storage 405 through communications unit 407.

I/O interface(s) 406 allows for input and output of data with other devices that may be connected to each computer system. For example, I/O interface(s) 406 may provide a connection to external device(s) 408, such as a keyboard, a keypad, a touch screen, and/or some other suitable input device. External device(s) 408 can also include portable computer readable storage media, such as, for example, thumb drives, portable optical or magnetic disks, and memory cards. Program instructions and data (e.g., Task component 111) used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method, on a web-based system using micro services, for assisting users with software development life cycle, the method comprising:
   in a computing device including one or more computer processors and memory storing executable code for at least one computer processor to execute a plurality of control and web-based interface actions, including:
      creating, by one or more computer processors, a goal object based on input by one or more users associated with the software development life cycle;
      creating, by the one or more computer processors, one or more task objects associated with the goal object, wherein the goal object and the one or more tasks associated with the goal object comprise a main path;
      executing, by the one or more computer processors, a first task based on selection of the one or more task objects via the web-based interface;
      creating, by the one or more computer processors, one or more delta task objects based on input via the web-based interface by the one or more users as part of deviations from the main path, wherein the one or more delta task objects are stored in a task library as alternative paths from the main path;
      determining, by the one or more computer processors, if there is one or more deviations from the deviations from the main path associated with executing the first task;
      responsive to determining there is the one or more deviations, adding, by the one or more computer processors, one or more additional delta task objects, based on the one or more deviations, to the goal object;
      storing, by the one or more computer processors, the one or more additional delta task objects as a selectable decision path for future execution of the one or more task objects;
      storing, by the one or more computer processors, the first task of the one or more task objects as a baseline task in the task library; and
      updating, by the one or more computer processors, the web-based interface to display each of the stored one or more delta task objects, the one or more additional delta task objects and the baseline task as selectable graphical elements for future users.

2. The computer-implemented method of claim 1, wherein creating the goal object represents a state of accomplishment to be achieved by the one or more users, wherein the goal object comprises the one or more task objects for completion.

3. The computer-implemented method of claim 1, wherein determining whether there is the one or more deviations associated with executing the first task further comprises:
   identifying, by the one or more users, one or more problems with the first task.

4. The computer-implemented method of claim 1, further comprising:
   sending a request to the administrator for an approval based on adding the one or more delta task objects; and
   receiving a response to the request for the approval from the administrator.

5. The computer-implemented method of claim 1, wherein adding the one or more delta task objects, based on the one or more deviations, to the goal object further comprises:
updating, by the user, the task object to add a deviation from multiple paths of the one or more task objects to achieve completion status by editing existing sub tasks to the selected task object.

6. The computer-implemented method of claim 1, wherein creating the one or more task objects further comprises:
representing an action that can be executed by the one or more users, wherein the one or more task objects is subdivided into sub tasks, wherein a top-level task of the one or more task objects is not complete until all sub tasks of the one or more task objects are completed and each of the sub tasks and the top-level task is assigned a deadline for a total amount of time allotted to complete.

7. The computer-implemented method of claim 1, further comprising:
selecting the goal object;
marking the one or more delta task objects;
updating a library associated with the goal object based on the one or more delta task objects, further comprising:
updating with the one or more deviations as part of the baseline task; and
completing the goal object.

8. The computer-implemented method of claim 7, wherein the updated web-based interface includes a selectable option to merge the one or more delta task objects to generate a new main path.

9. The computer-implemented method of claim 7, wherein selecting the goal object further comprises:
presenting the one or more users with multiple paths of the one or more delta tasks objects, including sub-tasks of the one or more task objects associated with the selected goal object and one or more criteria to complete the one or more task objects of the selected goal object.

10. The computer-implemented method of claim 7, wherein marking the one or more delta task objects further comprises:
identifying and marking the one or more delta task objects with the one or more deviations; and
adding the one or more deviations to the task object.

11. A computer system, on a web-based system using micro services, for assisting users with software development life cycle, the computer system comprising:
one or more computer processors;
one or more computer readable storage media; and
program instructions stored on the one or more computer readable storage media for execution by at least one of the one or more computer processors, the program instructions comprising:
program instructions to create a goal object based on input by one or more users associated with software development life cycle;
program instructions to create one or more task objects associated with the goal object, wherein the goal object and the one or more tasks associated with the goal object comprise a main path;
program instructions to execute a first task based on selection of the one or more task objects via the web-based interface;
program instructions to create one or more delta task objects based on input via the web-based interface by the one or more users as part of deviations from the main path, wherein the one or more delta task objects are stored in a task library as alternative paths from the main path;
program instructions to determine if there is one or more deviations from the deviations from the main path associated with executing the first task;
responsive to determine there is the one or more deviations, program instructions to add one or more additional delta task objects, based on the one or more deviations, to the goal object;
program instructions to store the one or more additional delta task objects as a selectable decision path for future execution of the one or more task objects;
program instructions to store the first task of the one or more task objects as a baseline task in the task library; and
program instructions to update the web-based interface to display each of the stored one or more delta task objects, the one or more additional delta task objects and the baseline task as selectable graphical elements for future users.

12. The computer system of claim 11, wherein program instructions to create the goal object represents a state of accomplishment to be achieved by the one or more users, wherein the goal object comprises the one or more task objects for completion.

13. The computer system of claim 11, wherein program instructions to determine whether there is the one or more deviations associated with executing the first task further comprises:
program instructions to identify, by the one or more users, one or more problems with the first task.

14. The computer system of claim 11, further comprising:
program instructions to send a request to the administrator for an approval based on adding the one or more delta task objects; and
program instructions to receive a response to the request from the administrator.

15. The computer system of claim 11, wherein the updated web-based interface includes a selectable option to merge the one or more delta task objects to generate a new main path.

16. The computer system of claim 11, wherein creating the one or more task objects further comprises:
program instructions to represent an action that can be executed by the one or more users, wherein the one or more task objects is subdivided into sub tasks, wherein a top-level task of the one or more task objects is not complete until all sub tasks of the one or more task objects are completed and each of the sub tasks and the top-level task is assigned a deadline for a total amount of time allotted to complete.

17. The computer system of claim 11, further comprising:
program instructions to select the goal object;
program instructions to mark the one or more delta task objects;
program instructions to update a library associated with the goal object based on the one or more delta task objects; and
program instructions to complete the goal object.

18. The computer system of claim 17, wherein program instructions to select the goal object further comprises:
program instructions to present the one or more users with multiple paths of the new one or more tasks objects, including sub-tasks of the one or more task objects associated with the selected goal object and one or more criteria to complete the one or more task objects of the selected goal object.

19. The computer system of claim 17, wherein program instructions to mark the one or more delta task objects further comprises:
    program instructions to identify and marking the one or more delta task objects with the one or more deviations; and
    program instructions to add the one or more deviations to the task object.

20. The computer system of claim 17, wherein program instructions to update the library further comprises:
    program instructions to update with the one or more deviations as part of the baseline task.

* * * * *